(12) United States Patent
Marur et al.

(10) Patent No.: US 10,005,409 B2
(45) Date of Patent: *Jun. 26, 2018

(54) REINFORCED PLASTIC ENERGY ABSORBER SYSTEM AND METHODS OF MAKING THE SAME

(71) Applicant: SABIC Global Technologies B.V., Bergen op Zoom (NL)

(72) Inventors: Sudhakar Ramamoorthy Marur, Karnataka (IN); Dhanendra Kumar Nagwanshi, Farmington Hills, MI (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/225,217

(22) Filed: Aug. 1, 2016

(65) Prior Publication Data
US 2016/0339859 A1 Nov. 24, 2016

Related U.S. Application Data

(60) Continuation of application No. 14/731,436, filed on Jun. 5, 2015, now Pat. No. 9,434,334, which is a
(Continued)

(51) Int. Cl.
*B60R 19/18* (2006.01)
*B60R 19/03* (2006.01)
(Continued)

(52) U.S. Cl.
CPC .............. *B60R 19/18* (2013.01); *B60R 19/03* (2013.01); *B60R 19/34* (2013.01); *F16F 7/003* (2013.01);
(Continued)

(58) Field of Classification Search
CPC ............ B60R 19/03; B60R 2019/1853; B60R 2019/186; B60R 19/18; B60R 19/34; F16F 7/003; F16F 7/124
(Continued)

(56) References Cited

U.S. PATENT DOCUMENTS 6,685,243 B1    2/2004  Evans
6,883,843 B2    4/2005  Van Damme et al.
(Continued)

FOREIGN PATENT DOCUMENTS

CN         1688464 A      10/2005
KR      19690000274 A     10/1969
KR      1020080023791 A    3/2008

OTHER PUBLICATIONS

Chinese Patent No. 1688464; Date of Publication: Oct. 26, 2005; Abstract Only, 1 page.
(Continued)

*Primary Examiner* — Joseph Pape
(74) *Attorney, Agent, or Firm* — Cantor Colburn LLP

(57) ABSTRACT

In one embodiment, an energy absorber comprises: a plurality of crush lobes, wherein the base, sides and outer wall comprise a first thermoplastic material; and a composite insert in the energy absorber, wherein the insert comprises a second plastic material and reinforcement, and wherein the composite insert is a separate element that is disposed in located at an area of the crush lobes, wherein the area is the side and/or the outer wall, and wherein the area has an area height and an area width. In an embodiment, a corner energy absorber can comprise: a plurality of layers with a plurality of ribs connecting the layers, wherein the layers and ribs comprise a first thermoplastic material; a composite insert comprising a second plastic material and reinforcement, and
(Continued)

wherein the composite insert is a separate element that is disposed in the layers, the ribs, or both.

18 Claims, 7 Drawing Sheets

Related U.S. Application Data continuation of application No. 14/190,717, filed on Feb. 26, 2014, now Pat. No. 9,050,939, which is a division of application No. 12/915,673, filed on Oct. 29, 2010, now Pat. No. 8,684,427.

(51) Int. Cl.
*B60R 19/34* (2006.01)
*F16F 7/00* (2006.01)
*F16F 7/12* (2006.01)

(52) U.S. Cl.
CPC ........ *F16F 7/124* (2013.01); *B60R 2019/186* (2013.01); *B60R 2019/1853* (2013.01)

(58) Field of Classification Search
USPC ........................................ 293/102, 120, 154
See application file for complete search history.

(56) References Cited

U.S. PATENT DOCUMENTS

| | | |
|---|---|---|
| 6,923,494 B2 | 8/2005 | Shuler et al. |
| 7,568,746 B2 | 8/2009 | Jaarda et al. |
| 8,220,850 B2 | 7/2012 | Opperman et al. |
| 8,505,990 B2 | 8/2013 | Czopek et al. |
| 8,684,427 B2 | 4/2014 | Marur et al. |
| 9,050,939 B2 | 6/2015 | Marur et al. |
| 2004/0066048 A1 | 4/2004 | Mooijman et al. |
| 2006/0055187 A1 | 3/2006 | Jaarda et al. |
| 2009/0206618 A1 | 8/2009 | Ralston et al. |
| 2010/0109353 A1 | 5/2010 | Allen et al. |
| 2015/0266437 A1 | 9/2015 | Marur et al. |

OTHER PUBLICATIONS

International Search Report; International Application No. PCT/IB2011/054488; International Filing Date: Oct. 11, 2011; Date of Mailing: Jan. 19, 2012; 5 Pages.

Written Opinion of the International Searching Authority; International Application No. PCT/IB2011/054488; International Filing Date: Oct. 11, 2011; Date of Mailing: Jan. 19, 2012; 6 Pages.

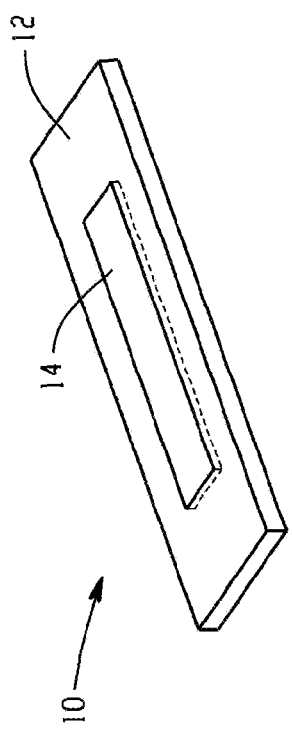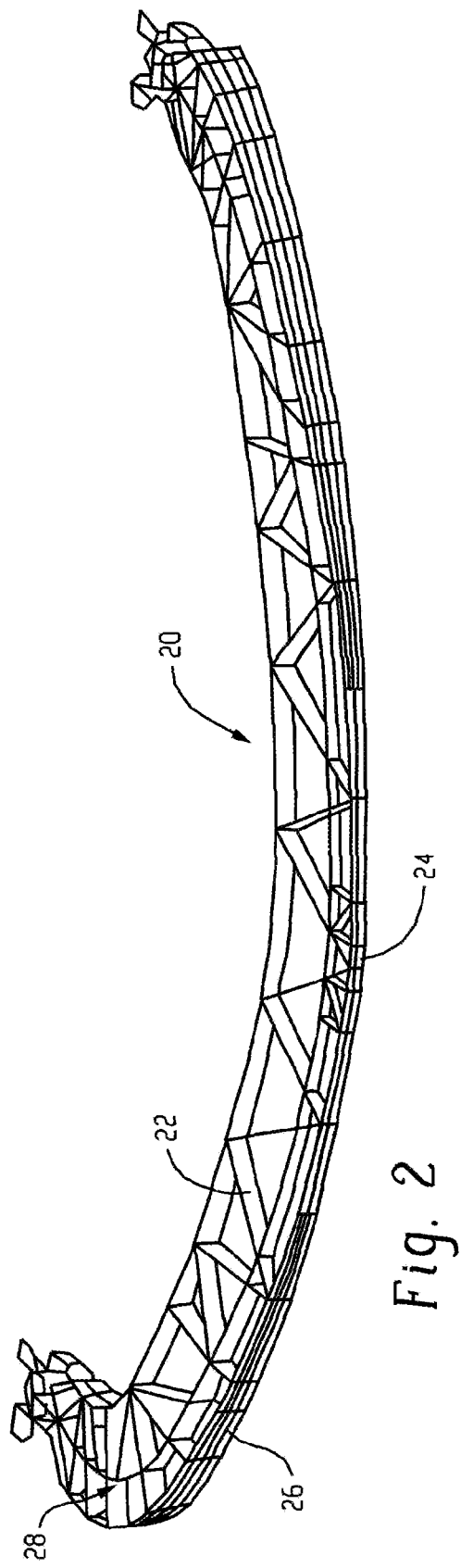

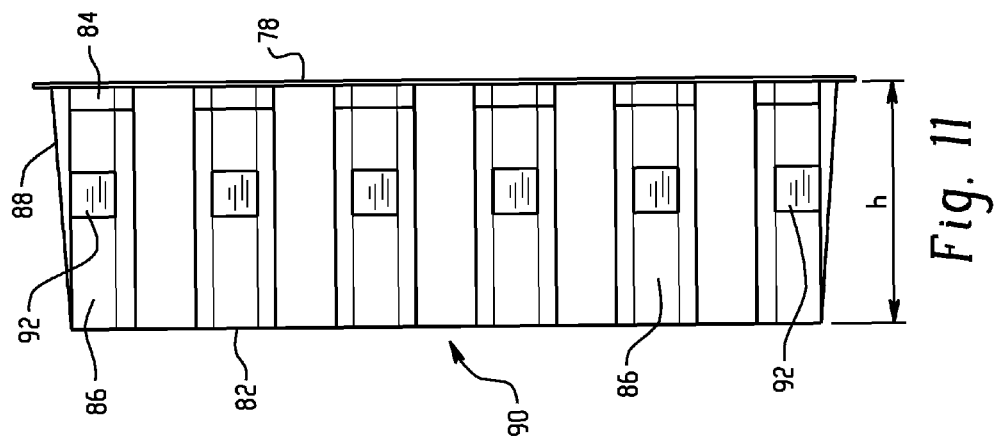
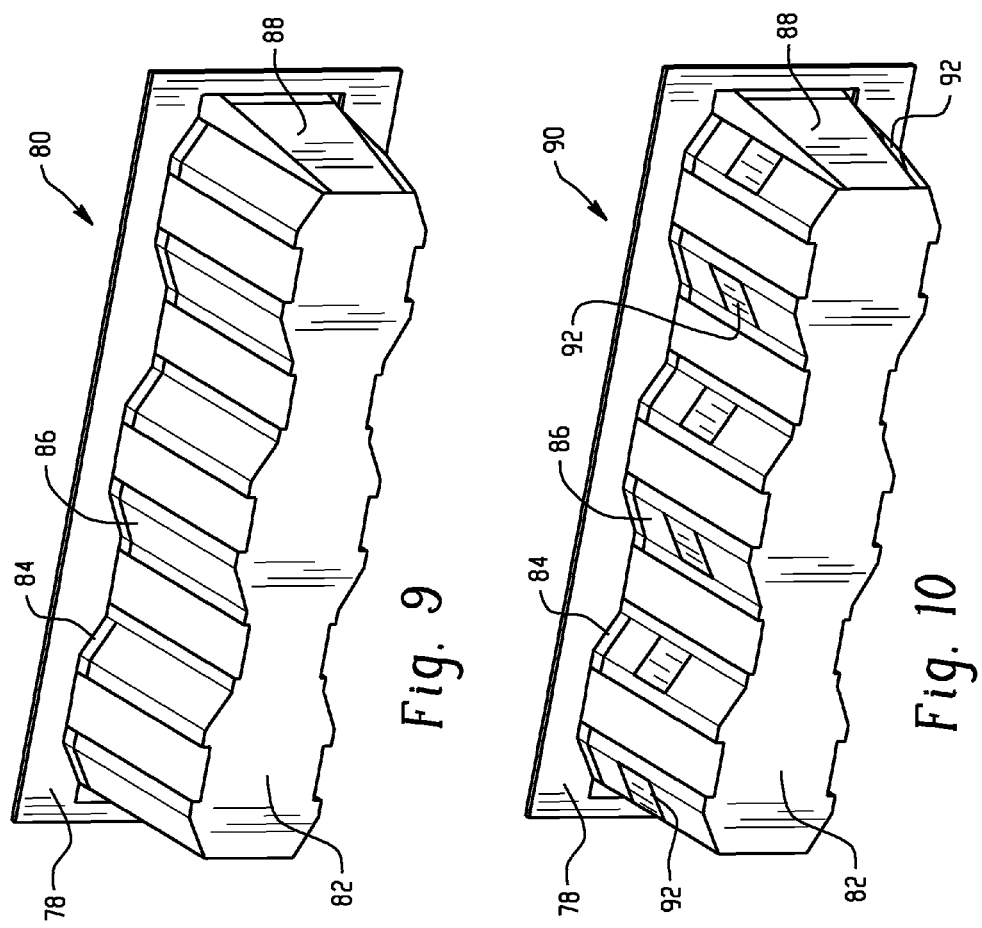

REINFORCED PLASTIC ENERGY ABSORBER SYSTEM AND METHODS OF MAKING THE SAME

CROSS REFERENCE TO RELATED APPLICATIONS

The present application is a continuation of U.S. patent application Ser. No. 14/731,436, filed Jun. 5, 2015, which is a continuation of U.S. patent application Ser. No. 14/190,717, filed Feb. 26, 2014, which is a division of U.S. patent application Ser. No. 12/915,673, filed Oct. 29, 2010, the contents of which are hereby incorporated by reference.

BACKGROUND

The present disclosure relates generally to energy absorbers for use in a vehicle, for example, to reduce injuries (e.g., to occupant(s), pedestrian(s), etc.) and/or to reduce vehicle damage.

Increased importance has been placed on methods for minimizing the amount of injury suffered by a person during an impact with a moving vehicle as well as the amount of vehicle damage. Different regulatory committees assess automotive-pedestrian and occupant impact performance globally. Depending on the overall performance, vehicles are assigned a cumulative safety rating. Each and every component of the vehicle needs to satisfy the specific impact criteria in order to ensure a good overall rating for the vehicle.

Due to the regulatory requirements and the desire to have, and commercial advantages of having, a high overall safety rating, vehicle manufacturers are continually adding components such as energy absorbers to the vehicle. Although energy absorbers generally provide safety benefits and/or lesser insurance cost, they add some weight to the vehicle, and restrict styling freedom due to additional packaging space requirements. Hence, vehicle manufactures are continually striving for high performance energy absorber systems with reduced weight and/or packaging space. Another approach has been to modify the geometrical configuration of an existing energy absorber design. However, this approach has not resulted in a significant weight change. These existing low performance systems generally require large amounts of packaging space to meet the impact regulations. A large packaging space, however, reduces the vehicle styling freedom. For example, many common energy absorber systems include foam as the energy absorbing element. The foam systems have lesser energy absorption efficiency (e.g., than injection molded plastic energy absorbers) and thus require more packaging space to absorb the same impact energy.

As a result, there is a continuing need to design an energy absorber that will deform and absorb impact energy to attain a good vehicle safety rating with a decreased weight and lower amount of packaging space resulting in increased design freedom. Furthermore, since different vehicle platforms have different components, due to their inherent geometry and assembly requirements, they require different energy absorber designs to satisfy the various impact criteria. A flexible solution to this problem is sought.

BRIEF DESCRIPTION

Disclosed, in various embodiments, are energy absorbing devices that can be used in conjunction with various vehicle components.

In one embodiment, an energy absorber comprises: a plurality of crush lobes, wherein the crush lobes include a base and sides extending from the base to an outer wall, wherein the base, sides and outer wall comprise a first thermoplastic material; and a composite insert in the energy absorber, wherein the insert comprises a second plastic material and reinforcement, and wherein the composite insert is a separate element that is disposed in located at an area of the crush lobes, wherein the area is the side and/or the outer wall, and wherein the area has an area height and an area width.

In an embodiment, a corner energy absorber can comprise: a plurality of layers with a plurality of ribs connecting the layers, wherein the layers and ribs comprise a first thermoplastic material; a composite insert comprising a second plastic material and reinforcement, and wherein the composite insert is a separate element that is disposed in the layers, the ribs, or both.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 1 is a perspective view of an embodiment of an insert molded into a wall of an energy absorber.

FIG. 2 is a prospective view of an embodiment of an energy absorber with insert(s) located along a portion of the energy absorber between two walls.

FIG. 9 is a prospective view of an embodiment of an energy absorber without composite inserts.

FIG. 10 is a prospective view of an embodiment of an energy absorber having the same materials and design as the energy absorber of FIG. 9 except with composite inserts on the side walls.

FIG. 11 is a top view of the energy absorber of FIG. 10.

DETAILED DESCRIPTION

Figure 3:
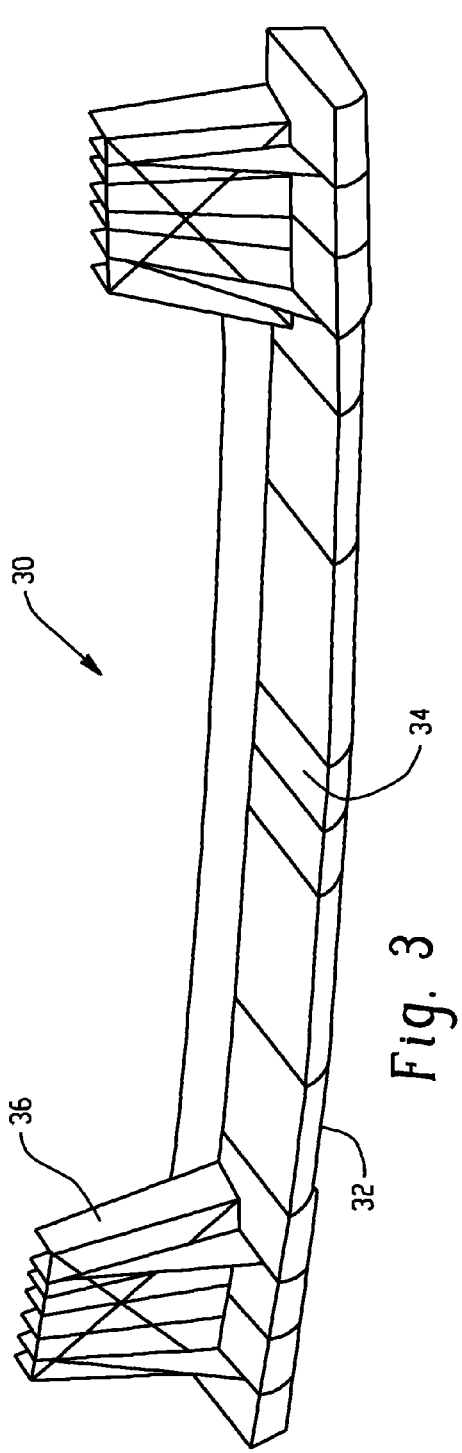
FIG. 3 is a prospective view of an energy absorber with an insert located in an underbar of the energy absorber.

Energy absorbers protect an individual and/or vehicle component by absorbing energy when a particular vehicle component is impacted. Therefore, during an impact at the location of a particular vehicle component, the impact energy can be absorbed by the energy absorber, thereby protecting the vehicle component, pedestrian, and/or occupant. When the energy absorber is separately demountable from the vehicle component, after the impact, if the energy absorber was able to absorb a sufficient amount of the impact energy, the energy absorber can be replaced without requiring the replacement of the vehicle component. Since the energy absorbers are designed to undergo plastic deformation (and optionally elastic deformation), they absorb energy upon impact, thereby reducing the damage to the pedestrian, occupant, and/or vehicle, accordingly. The energy absorbers can therefore reduce maintenance cost of the vehicle after impact.

It is clearly understood that the problems of reduced weight and greater design flexibility for energy absorbers are much greater than merely making thinner components or interchanging materials. Such solutions adversely affect performance such that the components no longer function as intended, failing to meet the requisite standards. Merely interchanging materials is insufficient in meeting the industries requirements for energy absorption, structural integrity, durability, design flexibility, and weight. Metals are heavy and, for example, do not have the desired energy absorption capabilities for the second or multiple impact cases. Plastics are lighter than metals, but, by nature, are softer and therefore may require higher thickness to attain the same strength, wherein the thicknesses are limited by tooling, and space. Furthermore, weight benefits gained by using a plastic can be lost if very thick components are required.

Disclosed herein, in various embodiments, are energy absorbers which can be used in conjunction with vehicle components, e.g., to minimize the vehicle damage and/or injury suffered in an impact. The energy absorbers comprise reinforced composite insert(s) (e.g., the insert(s) are located at (i.e., in or on) the side and/or outer wall of the energy absorber). The inserts enhance the structural integrity of the energy absorber, thereby tuning the energy absorption capabilities thereof, at the particular location. Hence insert(s) can be used at the crush lobe(s), the support structure (e.g., if the metal bumper beam has been replaced with a plastic support structure), and/or the crush can(s). In some of the embodiments, the insert is located in a portion of the energy absorber that extends in the z direction (See FIG. 7), for example, it extends away from the vehicle.

The insert can comprise a single or multiple layers, wherein the individual layers can have the same or different thicknesses and/or properties. Different lamination angles can also be employed. For example, an insert can have a sandwich structure with face and core of similar and/or dissimilar materials, as well as with functionally graded properties. In some embodiments, the insert can comprise a material that aligns more along one axis than another, e.g., the alignment axis. The various layers can then be stacked such that the alignment axis of one layer is at a different angle than the alignment axis of another layer (e.g., of an adjacent layer). For example, the layers can alternate 0 degrees, 90 degrees, 0 degrees, etc. (e.g., such that the alignment axis of one layer is perpendicular to the alignment axis of the adjacent layer). Other angles are also possible, e.g., 45 degrees, and so forth. The specific number of layers and the orientation of each layers' alignment axis is dependent upon the desired stiffness of that particular insert. Inserts employed in different portions of the energy absorber can have a different stiffness, as is desired for the particular location. In some embodiments, the insert comprises greater than or equal to 3 layers, specifically, 3 to 10 layers, more specifically, 4 to 7 layers. Optionally, the layers can have alternating alignment axes, such as alternating between 0 degrees and 90 degrees.

Because these inserts are separate elements (e.g., separate from the other components of the energy absorber as opposed to an element formed in situ with the remainder of the energy absorber), they can be strategically located in desired areas of the energy absorber. In other words, the insert does not need to be located throughout the energy absorber, unlike a reinforcement that is mixed into the plastic forming the energy absorber. The inserts can be strategically located in some or all of the side walls (e.g., the walls extending from the base to the outer wall of a crush lobe), and/or in the end wall(s), and/or in the outer wall(s), and/or in various rib(s), and/or extensions (for example, see rib 48 in FIG. 5, and side walls 86, end walls 88, and outer wall 82 in FIG. 10).

Use of the insert(s) can enable strategic reinforcement of the energy absorber. The strategic reinforcement enables (i) reduction of the overall weight of the energy absorber, (ii) reduction of the overall size of the energy absorber, and/or (iii) increase in the ability of the energy absorber to absorb energy upon impact. Increased energy absorption reduces vehicle damage and/or injury to occupants and/or pedestrians during an impact. The reduced weight and/or increased performance allows for increased design freedom for the automotive manufacturer because less packaging space is required with an energy absorber having a reduced weight and/or increased performance. In other words, the same performance levels can be attained in a reduced amount of space by using the present inserts. The energy absorbers described herein can improve system performance up to 40% (e.g., for low speed vehicle damageability requirements like Insurance Institute for Highway Safety (IIHS) impact regulations and/or lower leg safety requirements for pedestrian impact) and/or reduce the system weight and hence, system cost up to 30% (when compared to conventional plastic energy absorbers, meeting same criteria in same packaging space). Essentially, composite insert reinforcement in an energy absorber increases the efficiency of energy absorption and can help reduce the energy absorber depth (along vehicle axis; e.g., distance the absorber extends out from the vehicle (z direction)) by 20 to 30% compared to the same design and composition energy absorber without insert(s). In other case for same packaging space, an energy absorber with composite insert reinforcement improves the impact performance by 15 to 30% or more, compared to the same design and composition energy absorber without insert(s). The energy absorbers can also reduce the packaging space of the energy absorber in a vehicle component.

The energy absorbers comprise an insert that increases stiffness (as compared to the same thickness area and absorber material, but without the insert). The insert can be located at an area of the energy absorber (e.g., on a surface, extending into a wall, or between surfaces (e.g., in a wall)). The insert can provide relatively high stiffness without an increase or only a small increase (i.e., less than or equal to 1%) in system weight. For weight considerations, the inserts can be located in areas requiring greater stiffness in order to meet safety and/or energy absorption requirements, while not located in other areas. This enables a reduced thickness of the materials in the high stiffness areas without increasing weight in lower stiffness areas. During an impact, the energy absorbers comprising these inserts absorb significantly more energy than the energy absorber wall in contact with the inserts, or than a wall, of the same wall material and a thickness that is equal to the combined wall and insert thickness.

The specific dimensions of the energy absorber and the inserts therein are dependent upon its location in the vehicle and its function. For example, the insert's length and width will be dependent upon the amount of space available in the desired location of use. The depth and wall thicknesses (e.g., the distance between the supporting walls) will be dependent upon the available space, the desired stiffness, and the materials (or combination of materials) employed. The insert can have various sizes, number of layers, materials, and shapes, depending upon the desired location in the energy absorber. An exemplary shape includes a planar strip. Although the thickness of the insert will be dependent upon the particular energy absorption requirements for the particular location, generally, the insert can have a thickness of less than or equal to 10 millimeters (mm), specifically, 0.2 mm to 5 mm, more specifically, 0.5 mm to 3 mm. For example, when used as part of a crush lobe for a pedestrian energy absorber (e.g., impact speeds of 40 kilometers per hour (km/hr) lower leg impact and desired energy absorption of approximately 450 Joules), the insert thickness can be 0.2 mm to 5 mm, specifically 0.5 mm to 3 mm. When used as part of a crash can for vehicle impact (e.g., energy absorption of up to approximately 4,000 Joules), the insert thickness can be 0.2 mm to 5 mm, specifically 0.5 mm to 3 mm.

The insert is a composite material, e.g., reinforcement and plastic, and can comprise any plastic material(s) having the desired characteristics for the particular application (e.g., location) of the energy absorber in the vehicle. The reinforcement can be comprise plastic, metal, ceramic, glass, wood, and/or natural and synthetic composite material, and so forth, as well as combinations comprising at least one of the foregoing. For example, reinforcement material can be glass, carbon, titanium, aluminum, stainless steel, talc, mica, as well as combinations comprising at least one of the foregoing. The form of the reinforcement can be fibers (including woven, nonwoven (e.g., felt), chopped, in, and/or random fibers), flakes, beads, particles, and combinations comprising at least one of the foregoing forms of reinforcement. For example, the composite inserts can comprise continuous fibers. Alternatively, or in addition, discontinuous long and/or short fibers can be used.

Exemplary characteristics of the plastic material can include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. The plastic material used for the insert comprises a different plastic material than the portion of the energy absorber comprising the insert, and is a material compatible therewith. The plastic of the insert can be thermoplastic, thermoset, or a combination comprising at least one of the foregoing plastic materials. Exemplary plastic materials include thermoplastics such as polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). One commercially available material that can be used for the energy absorber is Xenoy®, which is commercially available from SABIC Innovative Plastics IP B.V. An exemplary thermoset material that can be used to form the insert is epoxy. Some exemplary inserts comprise PBT and fibers (e.g., metal, glass, or carbon), or polycarbonate and ceramic filler, or a plastic material and a woven mat, or a continuous fiber in an epoxy matrix (such as a continuous carbon fiber in an epoxy matrix).

The energy absorber can be made from a thermoplastic material and can comprise combinations comprising at least one of any of the above-described plastic materials. The material can optionally further include reinforcement distributed therethrough, such as fibers, pellets, flakes, particles, and so forth, as well as combinations comprising any of the foregoing.

The insert can comprise Young's modulus values of 0.05 $E^{+05}$ MPa to 2 $E^{+05}$ megaPascals (MPa), along the three principle axis, specifically, 0.5 $E^{+05}$ MPa to 1.5 $E^{+05}$ MPa along the principle axis, and 0.05 $E^{+05}$ MPa to 0.10 $E^{+05}$ MPa along the other two axis. The Shear modulus values along the three principle axis can be 4.0 $E^{+03}$ MPa to 7.0 $E^{+03}$ MPa, specifically, 5.0 $E^{+03}$ MPa to 6.0 $E^{+03}$ MPa. Poisson's ratio ("υ") can be 0.2 to 0.4, specifically, 0.25 to 0.35. The density can be 1,200 kilograms per cubic meter ($kg/m^3$) to 1,700 $kg/m^3$, specifically, 1,450 $kg/m^3$ to 1,650 $kg/m^3$. In an exemplary embodiment, the insert can comprise Young's modulus values of 1.2 $E^{+05}$ MPa, 0.079 $E^{+05}$ MPa, and 0.079 $E^{+05}$ MPa along the three principle axis, Shear modulus values along the three principle axis can be 5.5 $E^{+03}$ MPa, Poisson's ratio of 0.3, and a density of 1,580 $kg/m^3$.

The insert can comprise one or multiple layers oriented in the same or different directions. For example, each layer can be oriented in a different direction with respect to the adjacent layer. For example, each layer can be oriented perpendicular to the adjacent layer, such as a first layer can be oriented at 0 degrees, a second layer oriented at 90 degrees, a third layer oriented at 0 degrees, and so forth, depending upon the desired number of layers. The number of layers is not limited and can comprise any number of layers that will provide the desired impact and performance properties. The insert (composite) layup can be a multilayer cross-ply, angle-ply composite, and/or sandwich configuration (e.g., with stiffer faces and a weaker core). Additionally, the degree of orientation of the layers is not limited and can be any range of differing degrees of orientation between 0 degrees and 90 degrees.

The insert(s) can be located anywhere along the energy absorber and can be located at an area of the energy absorber (i.e., on the surface, into a surface, or within an area (e.g., encapsulated inside a wall)). In order to avoid separation of the insert from the area, or dislodging of an insert (e.g., during an impact), in some embodiments, the insert is located within the wall (e.g., is insert molded into the wall during the molding of the component).

Figure 5:
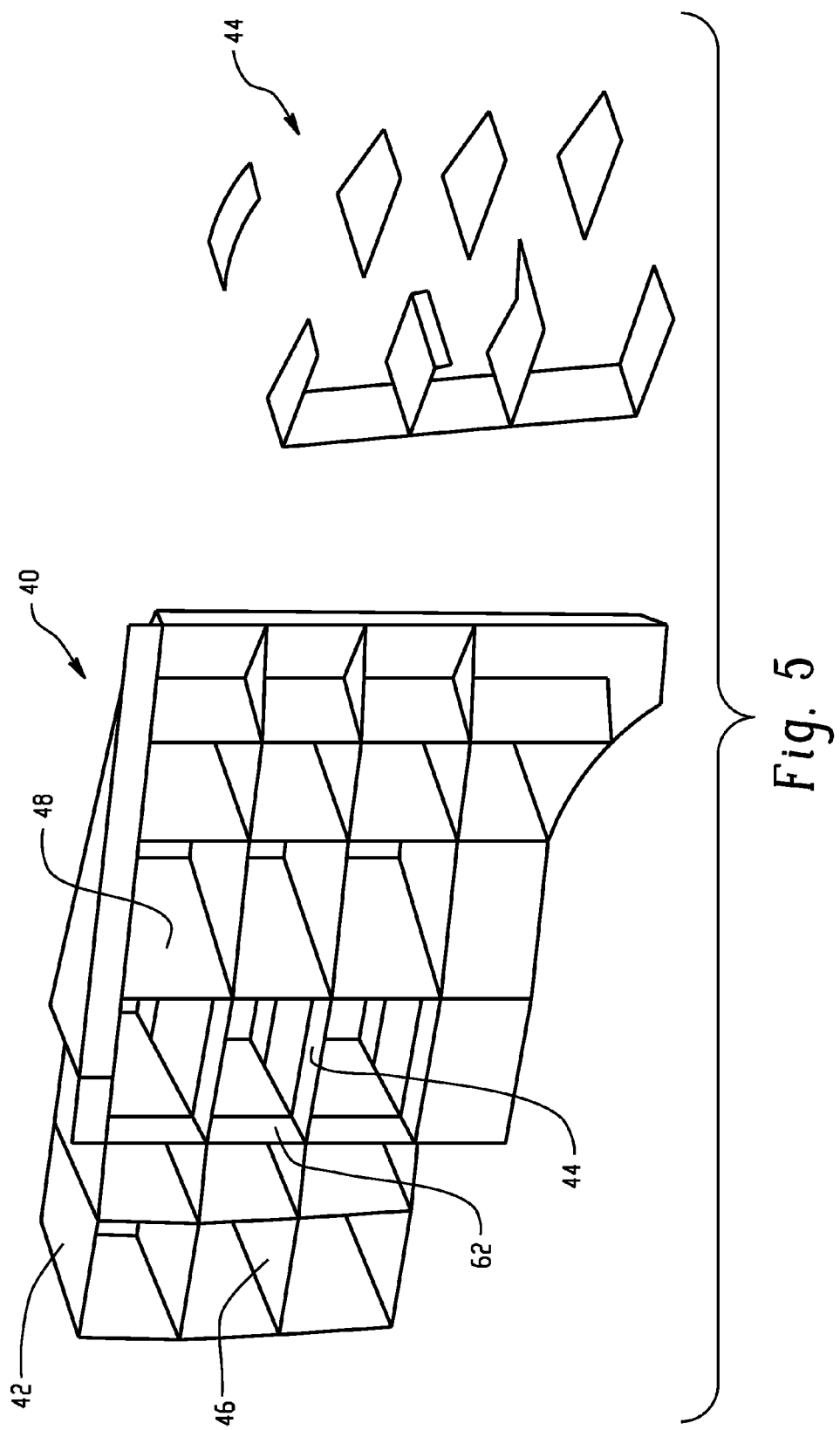
FIG. 5 is a rear view of the corner energy absorber of FIG. 4 with a separate view of the inserts included therein.
Figure 7:
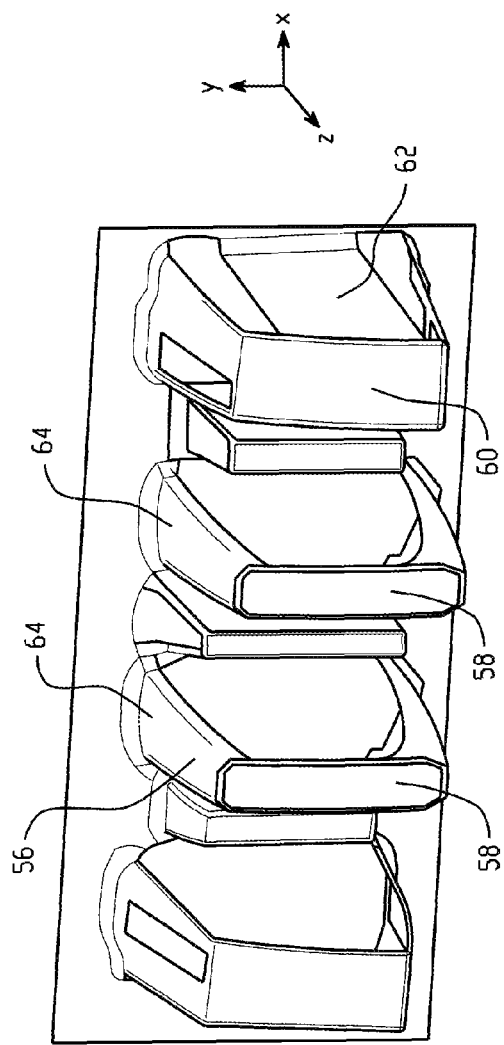
FIG. 7 is an expanded view of a group of crush lobes from the energy absorber of FIG. 6.

The energy absorbers comprising the insert(s), which can have an open configuration (e.g., open in the back (such as in the z direction on the side opposite the impact side; see FIGS. 5 and 7), or open in the top and/or bottom (y direction; see element 28 in FIG. 2)) or closed configuration, and have a side (e.g., outer wall) oriented to be subjected to impact. Another side of (e.g., base) the energy absorber can be located adjacent to a stiffer support so as to be crushable, e.g., located adjacent or attached to a base (such as a stiff base like the body in white (BIW), the bumper beam, or another automotive component). In some embodiments, the energy absorber is attached to the vehicle only at specific points (e.g., only attached to the two side rails, yet extending across the front of the vehicle).

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates an embodiment of a portion 10 of an energy absorber, e.g., illustrates the outer wall of an energy absorber such as the outer wall of a crush lobe (see FIG. 6), or a side wall of a crush lobe (see FIG. 10). This Figure shows an insert 14 molded into an energy absorber wall 12, while FIG. 10 shows the insert molded into the side wall of the crush lobe. The portion 10 can form any part of the energy absorber where enhanced impact strength is desired, such as a wall, (e.g., outer wall, side, rib, end(s), and/or connectors), base (e.g., /or base of a crush lobe), and so forth.

Furthermore, the insert can provide reinforcement to any desired area of the portion 10, such as less than or equal to 90% of the volume of the area comprising the insert (e.g., as less than or equal to 90% of the volume of the wall) can be insert, specifically, less than or equal to 65%, and more specifically, less than or equal to 50%. In some embodiments, the insert can have a height that is less than or equal to 90% of the height of the area portion of the component comprising the insert (e.g., see height "h" of side wall 86, FIG. 11), specifically, 20% to 70%, more specifically, 30% to 50%.

In various embodiments, the insert can have a depth that is greater than or equal to 20% of the depth (thickness) of the area (e.g., the portion of the component comprising the insert), specifically, greater than or equal to 50%, more specifically, greater than or equal to 65%, yet more specifically, 25% to 98%, even more specifically, 45% to 80% of the depth of the area.

In various embodiments, the insert can have a width (e.g., as is illustrated by line "w" in FIG. 1) that is greater than or equal to 30% of the width of the area of the component comprising the insert (e.g., portion 10), specifically, greater than or equal to 50%, more specifically, greater than or equal to 75%. Specifically, the insert width can be 30% to 100% of the width of the area, more specifically, 35% to 90% of the area width, yet more specifically, 40% to 65% of the area width.

Turning now to FIG. 2, illustrated is a lower spoiler component 20 that can provide lower leg support for more balanced energy absorption and improved rotation performance. The spoiler (e.g., energy absorber 20) comprises a first portion 22 designed to be between a second portion 24 (outer element that can contact the lower leg in an impact) and the body in white ("BIW"). As is illustrated, insert(s) 26 can be located at the second portion of the energy absorber, as a strip that extends at the second portion, or as a plurality of separate pieces strategically located at the second portion. The energy absorber 20 illustrated in FIG. 2 is configured for pedestrian protection upon impact, such that reduced forces to the pedestrian (e.g., reduced force to the knee region and/or lower leg region of the pedestrian) are observed upon an impact.

FIG. 3 illustrates another embodiment, where an energy absorber 30 comprises an underbar 32 with an insert 34 located on the underbar. Similar to the lower spoiler, the underbar illustrated in FIG. 3 supports the lower leg of a pedestrian during an impact, and reducing the rotation of the leg. The underbar comprises extensions 36 that are configured to connect the underbar 30 to the bumper beam and/or to and energy absorber attached thereto. The underbar can be a plastic component, hollow from the back, with inserts in along the front edge, or along walls extending from the open end to the front wall.

Figure 4:
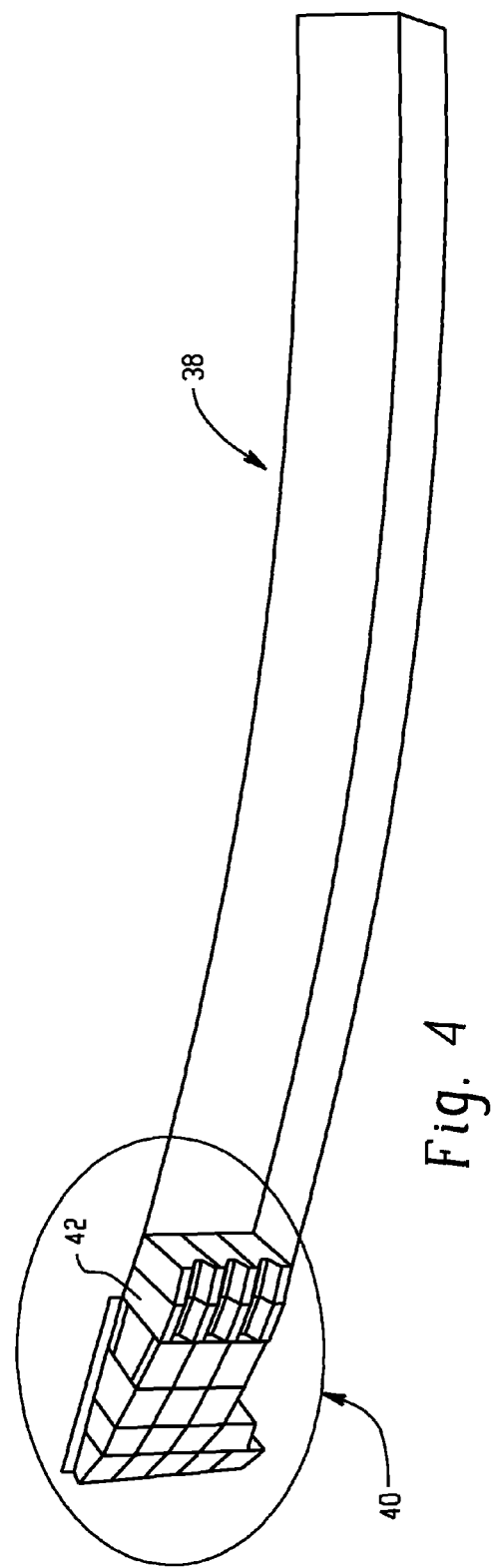
FIG. 4 is a schematic illustration of an embodiment of a corner energy absorber that can extend from the end of a bumper beam, wherein the energy absorber comprises inserts.

Now referring to FIGS. 4 and 5, a corner energy absorber 40 extending from an end of a bumper beam 38 is illustrated. The energy absorber 40 has an extension 42 that extends into the end of the bumper beam (i.e., into the hollow portion of the bumper beam) as illustrated in FIG. 4. The energy absorber 40 can comprise a multi-layer structure with the inserts 44 interspersed at the layers and/or ribs of the energy absorber 40 (see FIG. 5 which is a rear prospective view of the energy absorber 40 of FIG. 4). The multi-layer structure can comprise a number of horizontal layers 46 connected by a number of vertically extending ribs 48, with inserts disposed at the layers and/or ribs. As is illustrated, the rib 62 that will abut the bumper beam 38 (e.g., it will abut the edge of the bumper beam 38) when the extension 42 is inserted into the end of the bumper beam 38. Additionally, layers 46, or portions thereof, can also comprise insert(s) 44. For example, the portion of the layers 46 that are adjacent rib 62, on a side to be located outside of the beam 38 (e.g., that are not a portion of the extension 42; e.g., are between rib 62 and the next subsequent rib) can comprise insert(s).

The number of layers, ribs, and inserts is not limited and can be based upon desired energy absorption characteristics. The size and shape of the inserts 44 is also not limited and can be any size and shape that will provide maximum protection to the vehicle structure and components upon an impact. For example, the inserts can comprise a shape selected from the group consisting of square, rectangular, circular, triangular, elliptical, hexagonal, pentagonal, etc., and combinations comprising at least one of the foregoing. The energy absorber 40 illustrated in FIG. 4 can be designed to take into account the low speed vehicle damageability requirements for outboard impact to the vehicle bumper, like IIHS and Federal Motor Vehicle Safety Standards (FMVSS) impact requirements. For example, the inserts 44 can be configured to satisfy the 15% overlap bumper like barrier impact of IIHS bumper test protocols.

Figure 6:
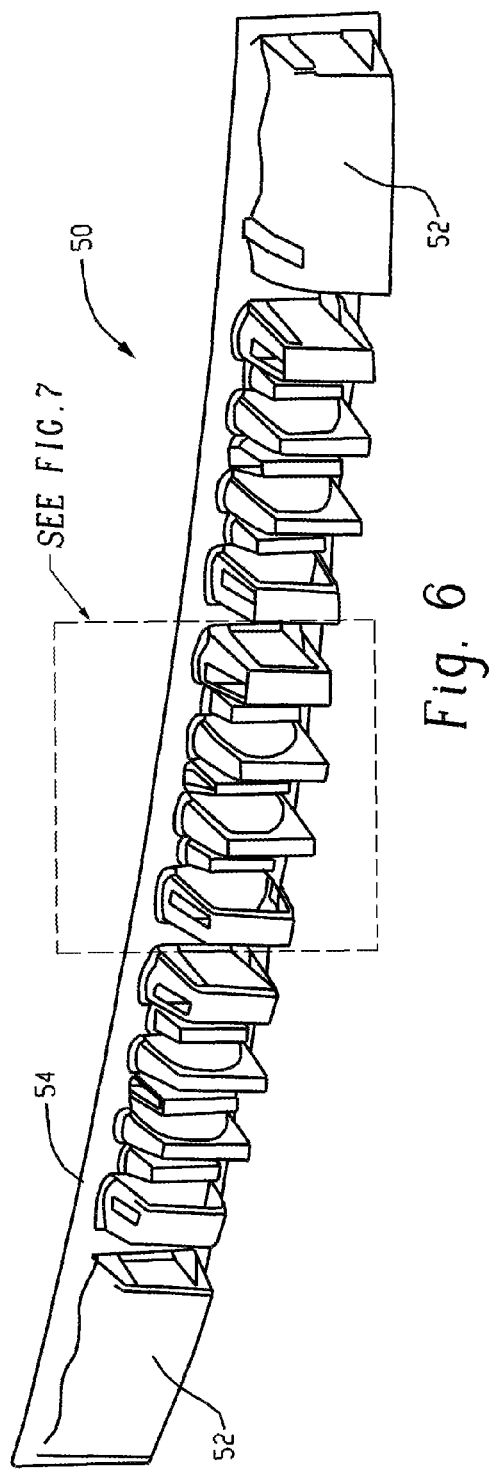
FIG. 6 is a schematic illustration of an embodiment of an energy absorber having inserts located on various crush lobes of the energy absorber.

FIG. 6 illustrates an embodiment of a dual stage energy absorber designed to meet low speed vehicle damageability and pedestrian lower leg impact requirements. The energy absorber 50 comprises a frame 54 to which crush boxes 52 are attached at either end or both thereof, with crush lobe(s) 56 located across the energy absorber 50 (e.g., between the crush boxes 52). A plurality of crush lobes 56 extend outwardly from the frame 54. These crush lobes 56 help in cushioning the knee of lower leg during the impact, whereas smaller stiffer crush boxes at the ends of the plurality of crush lobes 56, plays the key role for low speed impacts to vehicle. The crush lobes 56 can vary in size and thickness across the length of the frame to enable the energy absorber 50 to absorb the maximum desired amount of energy upon an impact. The crush lobes 56 can comprise an outer wall 60 that is spaced from the frame 54 a distance equal to an extending wall 62. The inserts 58 can be located on some or all of the outer walls 60 of the crush lobes 56 (e.g., can be disposed on the outer walls in an alternating fashion (e.g., every other two crush lobes comprises inserts) or in specific locations, (e.g., in the center crush lobes, in the outer most crush lobes, and/or in crush lobes near the ends of the plurality of crush lobes)).

In some embodiments, the crush lobe 56 can comprise a greater thickness at the outer wall 60 than at the frame 54 and the outer wall 60 of the crush lobe 56 can comprise a smaller cross sectional area than the base 64 of the crush lobe 56 attached to the frame 54. The inserts 58 allow the energy absorber 50 to provide significantly less load on the lower leg or knee of a pedestrian at substantially the same or only a slightly increased weight (e.g., less than or equal to a 1% increase in weight). This allows for a reduction in the packaging space required of the energy absorber, which enables more freedom for varying styles and designs to the automotive manufacturer.

As is illustrated in FIGS. 6 and 7, the crush lobes can have a single extending wall 62, or multiple walls with gap(s) therebetween to enable the crush lobe(s) to have the desired crush characteristics at the particular location. Also illustrated are insert(s) employed with selected crush lobes and not employed with others, again enabling tuning of the crush characteristics. For example, inserts can be employed on substantially "U" shaped crush lobes, wherein there is no extending wall on two opposite sides of the lobe and are extending walls on the other two extending walls, with the insert employed with the outer wall that connects the two extending walls. Optionally other crush lobes can be dispersed between the insert crush lobes. These other crush lobes optionally comprise extending walls on greater than or equal to 3 sides of the crush lobes, extending from the base to the outer wall.

FIG. 9 illustrates the pedestrian energy absorber without composite inserts, while FIG. 10 illustrates the same design of energy absorber as FIG. 9, except with composite inserts. Composite inserts are strategically placed in top and bottom load carrying walls of this energy absorber device to help attain controlled crushing of the energy absorber and better energy absorption in less packaging space. Here the energy absorbers are illustrated as having a height that is 15% to 25% of the area height (e.g., area 86), and a width that is 70% to 90% of the area width.

The energy absorber can be produced by several methods such as molding (e.g., over-molding), forming, or any other suitable manufacturing technique. For example, the energy absorber can be molded via insert injection molding with the insert placed in the injection molding cavity (e.g., with slight tool modification or redesign). The energy absorber can be made as a one-piece structure or as several components which are assembled together. For example, the crush wall(s) and support walls could be made separately then joined together by any suitable joining technique (e.g., adhesive, bonding, fastener(s) (such as a bolt, screw, clamp, snap-connector, and so forth)). In some embodiments, the energy absorber can be thermoformed as a single component. In some embodiments, the energy absorber can be injection molded as a single component.

Figure 8:
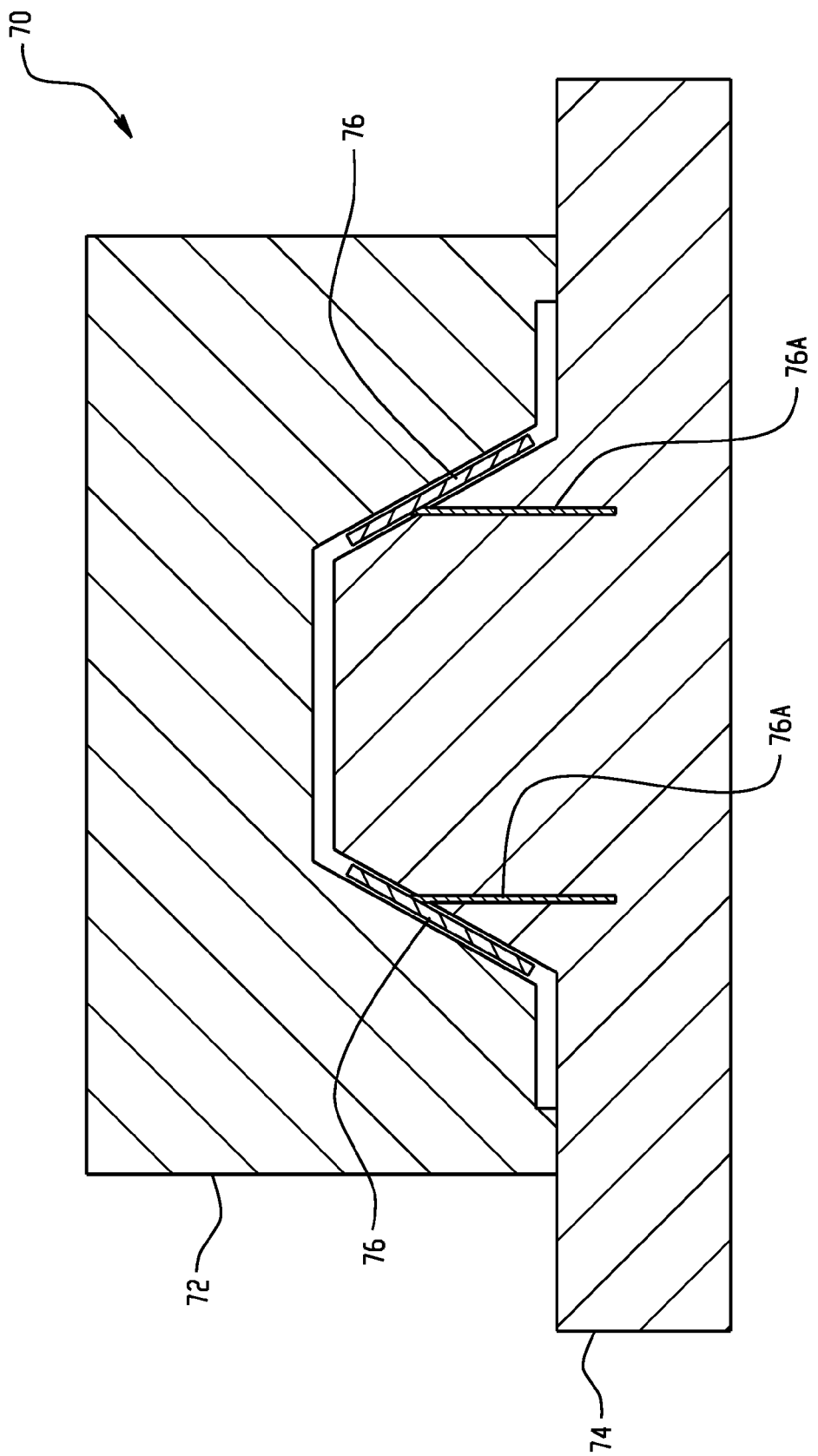
FIG. 8 is a schematic illustration of an embodiment of a mold for forming an energy absorber having an insert.

One method for forming the energy absorber is illustrated in FIG. 8 where a mold 70 comprises an upper mold portion 72 and a lower mold portion 74. Inserts 76 are illustrated in the opening between the upper mold portion 72 and the lower mold portion 74, e.g., with the help of holding pins (76A) as shown in FIG. 8. Inserts 76 can be placed into the mold cavity and molded to the energy absorber there with slight design or tool modification. The energy absorbers and inserts can be processed by insert injection molding, thermoforming, blow molding, as well as combinations comprising at least one of the foregoing. The inserts can be enclosed within the material comprising the energy absorber on both sides (e.g., the front and the back) or only one side (e.g., the front or the back). With the insert molding process, the insert becomes an integral part of the energy absorber.

The energy absorber is further illustrated by the following non-limiting examples.

EXAMPLES

Various energy absorbers in all of the examples were evaluated with CAE studies (simulations) to compare impact performance of the herein described energy absorbers comprising an insert with energy absorbers that did not comprise an insert. Throughout the examples, the insert was cut from a 2 mm thick sheet of a laminated five layer (0°-90°-0°-90°-0°) lay-up of a three-dimensional weave of continuous carbon fiber in an epoxy matrix.

Example 1

Pedestrian Protection

Table 1 illustrates the performance summary for lower leg impact on a generic vehicle platform with a lower spoiler design corresponding to FIG. 2. In Table 1, a lower spoiler made from glass filled polyimide (Sample 1) and a lower spoiler made from Xenoy® resin (Sample 2), neither comprising an insert were compared with an energy absorber made from Xenoy® resin comprising an insert (Sample 3) and an energy absorber comprising an insert that spanned the full width of the vehicle front (Sample 4). Sample 1 and 2 had no inserts, and Sample 3 had an insert at the center of the front face of lower spoiler (the insert had a height that was about 80% of the wall height and extended the full length of the outer wall), as is shown in FIG. 2.

The vehicle bumper system incorporating proposed lower spoiler is impacted with a commercially available lower leg model and a knee acceleration model, i.e., G-load in units of gravity (G), knee bending (i.e. rotation in degrees (deg)), and tibia shear in millimeters (mm) are estimated by CAE model using LS-DYNA software (commercially available from Livermore Software Technology Corp, California, USA). Desirably, the maximum rotation should not exceed 15 degrees, the maximum G load refers to the load on knee or lower leg of a pedestrian upon impact and the maximum acceptable value is 150. The maximum shear should not exceed 6 mm and the maximum rotation should not exceed 15 degrees.

TABLE 1

| Sample No. | | System Weight (kg) | Composite Insert Weight (kg) | Max. G Load | Max. Rotation (Degrees) | Max. Shear (mm) |
| --- | --- | --- | --- | --- | --- | --- |
| 1 | polyimide-lower spoiler | 1.16 | N/A | 151.1 | 9.1 | 1.9 |

TABLE 1-continued

| Sample No. | | System Weight (kg) | Composite Insert Weight (kg) | Max. G Load | Max. Rotation (Degrees) | Max. Shear (mm) |
|---|---|---|---|---|---|---|
| 2 | Xenoy ® resin lower spoiler | 1.01 | N/A | 108.4 | 15.5 | 2.8 |
| 3 | Xenoy ® resin lower spoiler with composite insert | 0.85 | $9.50 \times 10^{-4}$ | 99.9 | 13.4 | 2.9 |
| 4 | Xenoy ® resin lower spoiler with composite insert over full span of vehicle | 0.88 | 0.039 | 98 | 12.9 | 2.9 |

Table 1 illustrates a significant reduction in weight for Samples 3 and 4 compared to Samples 1 and 2. Samples 3 and 4 demonstrated acceptable rotation values (less than 15 degrees) and comparable shear values as compared to Samples 1 and 2 even with the lower weight values of Samples 3 and 4. For example, Sample 3 contained 16% less weight than Sample 2 and 27% less weight than Sample 1, while Sample 4, which spanned the full width of the vehicle front, contained 9% less weight than Sample 2 and 21% less weight than Sample 1. Additionally, the maximum G load is significantly less with Samples 3 and 4 than Samples 1 and 2, indicating that a pedestrian will suffer less force upon an impact when an insert is used due to the insert absorbing more of the energy upon impact as compared to energy absorbers that do not contain the inserts.

Table 2 illustrates the performance summary for lower leg impact on a generic vehicle platform with an underbar design corresponding to FIG. 3. Sample 5 was made from Xenoy® resin with no insert and Sample 6 was made also made from Xenoy® resin but also contained the insert. The same properties as discussed above with respect to Samples 1 to 4 were measured using the same procedures and equipment.

TABLE 2

| Sample No. | | Weight (kg) | Max G Load | Max. Rotation (Degree) | Max. Shear (mm) |
|---|---|---|---|---|---|
| 5 | Xenoy ® resin Underbar | 1.5 | 119.9 | 11.9 | 1.7 |
| 6 | Xenoy ® resin Underbar with composite insert | 1.26 | 99.3 | 12.8 | 2.9 |

Sample 6 contained a reduction in weight of 16% but demonstrated comparable maximum rotation values (12.8 for Sample 6 versus 11.9 for Sample 5) and comparable shear values. Samples 1 through 6 illustrate that energy absorbers containing an insert and designed to have a lower weight than comparable energy absorbers can perform the substantially the same or better than energy absorbers that do not contain an insert. However, the energy absorbers comprising an insert due to the decreased weight cost less to produce and/or replace. Samples 1 through 6 also illustrate that the energy absorber weight can be reduced significantly without compromising the performance of the structure upon the application of an impact.

Example 2

Vehicle Damageability

Table 3 illustrates the performance summary for an IIHS bumper like barrier with a 15% overlap on a generic vehicle platform with an injection molded corner energy absorber corresponding to FIGS. 4 and 5. Samples 7 and 8 were both injection molded. The corner energy absorber extended from both the end of a bumper beam. The corner energy absorber has an extension that extended into the end of the bumper beam (i.e., into the hollow portion of the bumper beam) as illustrated in FIG. 4. The energy absorbers in Samples 7 and 8 contained extensions on the ends of the energy absorbers designed to absorb energy upon impact. Sample 8 comprised inserts on the extensions. The inserts were set in the design illustrated in FIGS. 4 and 5. The vehicle bumper system incorporating a proposed corner energy absorber is impacted with a commercially available 'Bumper like barrier for IIHS protocols' and a Force in units of kiloNewtons (kN) and intrusion in millimeters (mm) are estimated by CAE model using the LS-DYNA software. Maximum intrusion refers to the amount the energy absorber impacts into the vehicle when there is a collision. The maximum force should generally be below 60 kN.

TABLE 3

| Sample No. | | System Weight (kg) | Composite Insert Weight (kg) | Max. Force (kN) | Max. Intrusion (mm) |
|---|---|---|---|---|---|
| 7 | Xenoy ® corner EA with extensions | 0.51 | N/A | 16.2 | 122 |
| 8 | Xenoy ® corner EA with extensions and composite insert on extensions | 0.49 | 0.025 | 32.6 | 76.2 |

Sample 8 contained 1% greater weight than Sample 7, but demonstrated a significant improvement in the maximum intrusion into the vehicle upon impact of 38% less than Sample 7 and an acceptable maximum force value. Sample 8 demonstrates that with the inserts located on the extensions less intrusion into the vehicle occurs, which translates to a lower repair cost. Additionally, the initial cost of the energy absorber of Sample 8 should be similar to that of Sample 7, since Sample 8 only contained 1% greater weight than Sample 7.

Example 3

Dual Stage Energy Absorber

Tables 4 and 5 illustrate the performance summary for a Xenoy® resin energy absorber designed for global use for lower leg impact performance and low speed vehicle damageability on a generic vehicle platform, as described in U.S. Pat. No. 7,568,746. The maximum G load, maximum rotation, and maximum shear were measured as described above with respect to Samples 1 to 6. Each of Samples 9 to 12, 13, and 15 occupied 85 mm of packaging space, while Samples 14 and 16 only occupied 80 mm of packaging space. Samples 10, 12, 14, and 16 each contained an insert as shown in FIGS. 6 and 7, while Samples 9, 11, 13, and 15 did not. Y0 is the impact at center of the vehicle bumper along the width and Y264 is an impact 264 mm outboard from center of the vehicle.

TABLE 4

| Sample No. | | System Weight (kg) | Composite Insert Weight (kg) | Max. G Load | Max. Rotation (Degree) | Max. Shear (mm) |
|---|---|---|---|---|---|---|
| | Y-0 Impact Location | | | | | |
| 9 | Xenoy ® resin Dual stage EA (85 mm)* | 0.92 | N/A | 141.5 | 15 | 1.5 |
| 10 | Dual stage EA with composite insert (85 mm)* | 0.92 | 0.025 | 130.1 | 15 | 1.5 |
| | Y-264 Impact Location | | | | | |
| 11 | Xenoy ® resin Dual stage EA (85 mm)* | 0.92 | N/A | 158.6 | 15.8 | 1.7 |
| 12 | Dual stage EA with composite insert (85 mm)* | 0.92 | 0.025 | 132.6 | 15.7 | 1.3 |

*This value indicates the packaging space.

TABLE 5

| Sample No. | | System Weight (kg) | Composite Insert Weight (kg) | Max. G Load | Max. Rotation (Degree) | Max. Shear (mm) |
|---|---|---|---|---|---|---|
| | Y-0 Impact Location | | | | | |
| 13 | Xenoy ® resin Dual stage EA (85 mm)* | 0.89 | N/A | 141.5 | 15 | 1.5 |
| 14 | Dual stage EA with composite insert (80 mm)* | 0.89 | 0.025 | 141.8 | 15.6 | 2 |
| | Y-264 Impact Location | | | | | |
| 15 | Xenoy ® resin Dual stage EA (85 mm)* | 0.89 | N/A | 158.6 | 15.8 | 1.7 |
| 16 | Dual stage EA with composite insert (80 mm)* | 0.89 | 0.025 | 146.9 | 16.4 | 1.8 |

*This value indicates the packaging space.

Samples 10 and 12 demonstrate a significant improvement in performance pertaining to the maximum G load or the force exerted on a pedestrian during an impact. Sample 10 had an 8% improvement compared to Sample 9, while Sample 12 had a 16% improvement compared to Sample 11 with only a 0.1% increase in weight due to the inserts. Sample 11 demonstrated an unacceptable maximum G load of 158.6. Samples 14 and 16 showed similar results even with a 5 mm or 6% reduction in packaging space with only a 0.1 increase in weight due to the inserts. Here the data shows the comparative performance of energy absorbers with and without inserts.

Example 4

Pedestrian Protection

Table 6 illustrates the performance summary for lower leg impact on a generic vehicle platform with an energy absorber design corresponding to FIG. 10. In Table 6, an energy absorber made from Xenoy® resin is compared with an energy absorber made from Xenoy® resin comprising an insert. A vehicle bumper system incorporating the proposed energy absorber is impacted with a commercially available lower leg model and a knee acceleration model, i.e., G-load in units of gravity (g), knee bending (i.e. rotation in degrees (deg)), and tibia shear in millimeters (mm) are estimated by CAE model using the LS-DYNA software.

TABLE 6

| Sample No. | | Max. G-Load (G) | Max Rotation (degrees) |
|---|---|---|---|
| 17 | Xenoy ® resin pedestrian EA | 152 | 16 |
| 18 | Xenoy ® resin Pedestrian EA with composite inserts | 124 | 14.2 |

Figure 12:
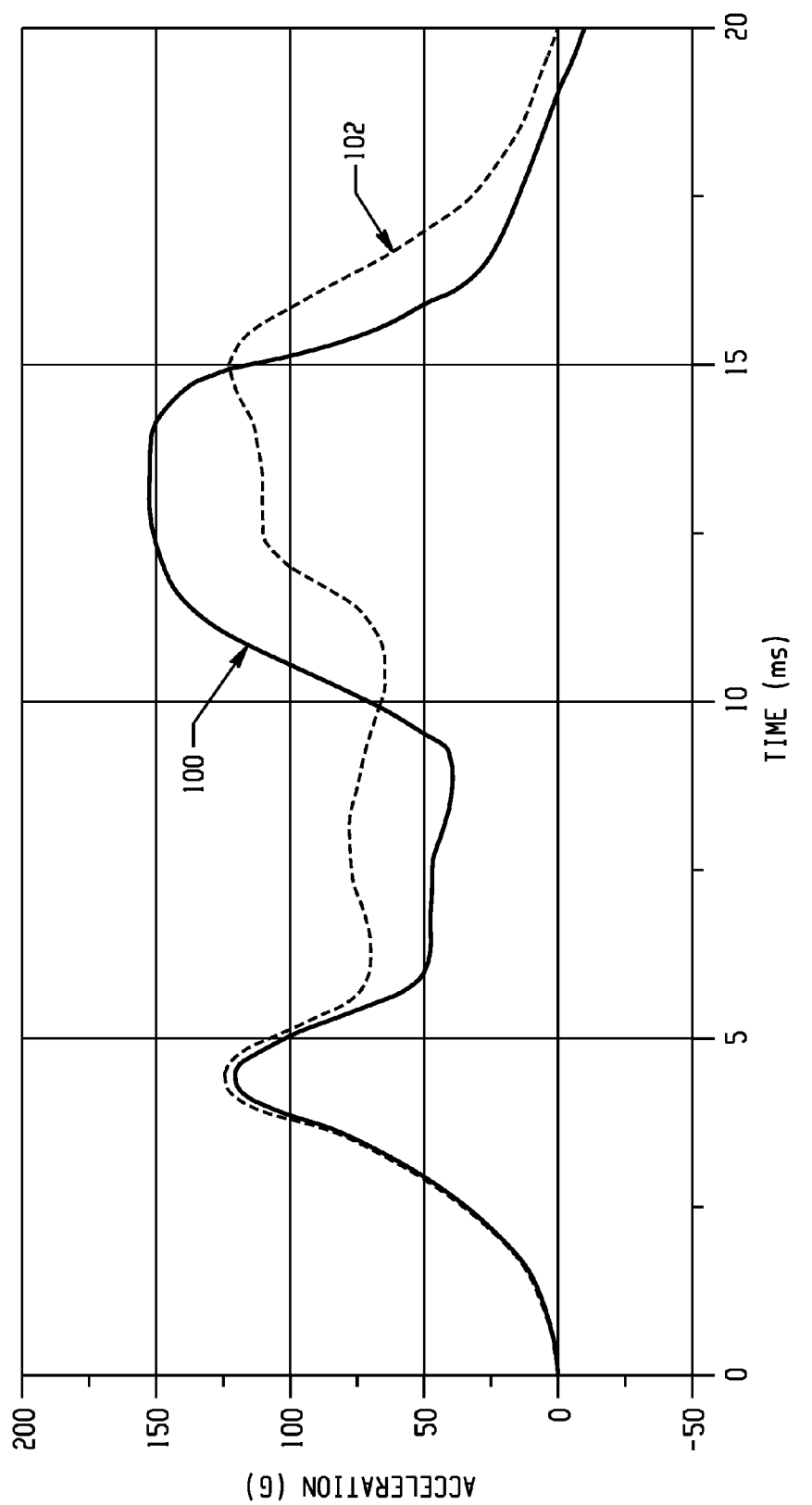
FIG. 12 is a Knee Acceleration versus Time plot for the energy absorbers illustrated in FIGS. 9 and 10.

Sample 18 demonstrates a significant improvement in performance pertaining to the maximum G load or the force exerted on a pedestrian during an impact and knee bending, i.e., rotation. This is graphically illustrated in FIG. 12, wherein line 102 is Sample 18, and line 100 is Sample 17. Incorporating inserts in the energy absorber helps controlling the crushing of load walls of the energy absorber, which increases the energy absorption in same packaging space and reduces the G-load and rotation values.

The energy absorbers disclosed herein comprising an insert offer a low cost, high performance solution to the challenges facing automobile manufacturers. The energy absorbers comprising an insert offer similar or even improved performance at lower or only slightly higher weights. With the energy absorbers having reduced weight with the inserts, substantially similar or even greater impact resistance and/or protection to a pedestrian can be observed. With the energy absorbers having the same or a slightly increased weight with the inserts, packaging space can be reduced with an increase in impact performance.

In one embodiment, an energy absorber, comprises: a plurality of crush lobes that deform plastically upon impact to absorb energy, wherein the crush lobes include a base and sides extending from the base to an outer wall, wherein the base, sides and outer wall comprise a first material; and a composite insert in the energy absorber, wherein the insert comprises a second plastic material and reinforcement, wherein the second plastic material is different than the first thermoplastic material, wherein the insert is located at an area of the crush lobes, and wherein the area is the side and/or the outer wall.

In another embodiment, an energy absorber comprises: a plastic frame; thermoplastic crush lobes extending from the frame, wherein the crush lobes comprise an outer wall, an extending wall, and a base; and a plastic insert located at an area having a volume of the crush lobes, wherein the insert occupies less than or equal to 90% of the area volume. The insert comprises a reinforcement and a plastic material different than the thermoplastic crush lobes.

In one embodiment, a vehicle comprises: the energy absorber assembly and a fascia covering the energy absorber assembly.

In another embodiment, a vehicle, comprising: energy absorber assembly and a fascia covering the energy absorber assembly. The energy absorber assembly comprises a plurality of plastic crush lobes that deform plastically upon impact to absorb energy, wherein the crush lobes include a base and a side extending from the base to an outer wall located on an end of the side opposite the base, wherein the base, side and outer wall comprise a first material; a composite insert comprising a second plastic material and reinforcement, wherein the second plastic material is different than the first thermoplastic material, wherein the insert is located at the side and/or the outer wall; crash cans located at each end of the energy absorber; and a composite insert located at the crash can and/or at crush lobe. The energy absorber assembly is connected to vehicle rails.

A method of making an energy absorber, comprising: insert molding a thermoplastic energy absorber comprising crush lobes having a base and an outer wall, with sides extending from the base to the outer wall, wherein a reinforced plastic insert is located in at least one the sides.

In the various embodiments: (i) the reinforcement can comprise continuous fibers; and/or (ii) the area can have a volume and wherein the insert occupies less than or equal to 65% of the volume; and/or (iii) the area can have a height "h", a thickness, and a width "w", and wherein the insert has an insert height that is less than or equal to 90% of the area height, and has an insert width that greater than or equal to 30% of the area width; and/or (iv) the insert height is 20% to 70% of the area height and the insert width is 40% to 75% of the area width; and/or (v) the reinforcement is selected from the group consisting of glass, carbon, titanium, aluminum, stainless steel, talc, mica, and combinations comprising at least one of the foregoing; and/or (vi) the reinforcement comprises carbon fibers; and/or (vii) the second plastic material comprises a thermoset; and/or (viii) wherein the thermoset is epoxy.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An energy absorber, comprising:
    a plurality of crush lobes, wherein the crush lobes include a base and sides extending from the base to an outer wall, wherein the base, sides and outer wall comprise a first thermoplastic material; and
    a composite insert in the energy absorber, wherein the insert comprises a second plastic material and reinforcement, wherein the second plastic material comprises at least one of polypropylene, polybutylene terephthalate, and polyamide, and wherein the composite insert is a separate element that is disposed in an area of the crush lobes, wherein the area is the side and/or the outer wall, and wherein the area has an area height and an area width;
    wherein the reinforcement comprises continuous fibers.

2. The energy absorber of claim 1, wherein the reinforcement comprises glass.

3. An energy absorber, comprising:
    a plurality of crush lobes, wherein the crush lobes include a base and sides extending from the base to an outer wall, wherein the base, sides and outer wall comprise a first thermoplastic material; and
    a composite insert in the energy absorber, wherein the insert comprises a second plastic material and reinforcement, wherein the second plastic material comprises at least one of polypropylene, polybutylene terephthalate, and polyamide, and wherein the composite insert is a separate element that is disposed in an area of the crush lobes, wherein the area is the side and/or the outer wall, and wherein the area has an area height and an area width;
    wherein the area has a volume and wherein the insert occupies less than or equal to 65% of the volume.

4. The energy absorber of claim 1, wherein the area has a height "h", a thickness, and a width "w", and wherein the composite insert has an insert height that is less than or equal to 90% of the area height, and has an insert width that is greater than or equal to 30% of the area width.

5. The energy absorber of claim 1, wherein the insert height is 20% to 70% of the area height and the insert width is 40% to 75% of the area width.

6. The energy absorber of claim 1, wherein the first material comprises at least one of polypropylene, polybutylene terephthalate, and polyamide.

7. The energy absorber of claim 6, wherein the first material comprises polypropylene.

8. The energy absorber of claim 6, wherein the first material comprises at least one of polybutylene terephthalate and polyamide.

9. The energy absorber of claim 6, wherein the second material comprises polybutylene terephthalate.

10. The energy absorber of claim 6, wherein the second material comprises polyamide.

11. The energy absorber of claim 6, wherein the second material comprises polypropylene.

12. The energy absorber of claim 1, wherein the second material comprises at least one of polypropylene, polybutylene terephthalate, and polyamide.

13. The energy absorber of claim 1, wherein the second material comprises polypropylene.

14. A corner energy absorber, comprising:
a plurality of layers with a plurality of ribs connecting the layers, wherein the layers and ribs comprise a first thermoplastic material, wherein the first thermoplastic material comprises at least one of polypropylene, polybutylene terephthalate, and polyamide;
a composite insert comprising a second plastic material and reinforcement, wherein the second plastic material comprises at least one of polypropylene, polybutylene terephthalate, and polyamide, and wherein the composite insert is a separate element that is disposed in the layers, the ribs, or both;
wherein the reinforcement comprises continuous fibers.

15. The corner energy absorber of claim 14, wherein the reinforcement comprises glass fibers.

16. The corner energy absorber of claim 14, wherein the first material comprises polypropylene.

17. The corner energy absorber of claim 14, wherein the second material comprises polypropylene.

18. The corner energy absorber of claim 14, wherein the second material comprises at least one of polybutylene terephthalate and polyamide.

* * * * *